United States Patent
Zhao et al.

(10) Patent No.: US 9,541,760 B2
(45) Date of Patent: Jan. 10, 2017

(54) LASER SCANNING HEAD-UP DISPLAY SYSTEM FOR VEHICLES

(71) Applicant: Johnson Controls GmbH, Burscheid (DE)

(72) Inventors: Yanning Zhao, Monheim am Rhein (DE); Hannes Rene Boehm, Köln (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 14/420,478

(22) PCT Filed: Aug. 9, 2013

(86) PCT No.: PCT/EP2013/066725
§ 371 (c)(1),
(2) Date: Feb. 9, 2015

(87) PCT Pub. No.: WO2014/023830
PCT Pub. Date: Feb. 13, 2014

(65) Prior Publication Data
US 2015/0212321 A1    Jul. 30, 2015

(30) Foreign Application Priority Data

Aug. 10, 2012   (DE) .................. 10 2012 015 809
Jan. 23, 2013   (DE) .................. 10 2013 001 097

(51) Int. Cl.
| | | |
|---|---|---|
| G02B 27/14 | (2006.01) | |
| G02B 27/01 | (2006.01) | |
| G02B 27/48 | (2006.01) | |

(52) U.S. Cl.
CPC .......... *G02B 27/0101* (2013.01); *G02B 27/48* (2013.01); *G02B 2027/0141* (2013.01); *G02B 2027/0147* (2013.01)

(58) Field of Classification Search
CPC ................ B60K 2350/965; B60K 2350/1052; B60K 2350/1028; B60K 2350/1064; B60R 2300/205; B60R 1/00; B60R 2300/308; G06K 9/00818; G06K 9/00805; G06K 9/00798; G02B 2027/012; G02B 5/30; G02B 2027/0154; G02B 27/0101; G02B 2027/015
(Continued)

(56) References Cited

FOREIGN PATENT DOCUMENTS

| | | |
|---|---|---|
| CA | 2205994 | 5/1997 |
| DE | 195 40 108 A1 | 4/1997 |

(Continued)

OTHER PUBLICATIONS

Fan Chao et al., Development of a Micromirror Based Laser Vector Scanning Automotive HUD, pp. 75-79, Proceedings of the 2011 IEEE, International Conference on Mechatronics and Automation, Aug. 7-10, Beijing, China.*

(Continued)

*Primary Examiner* — Stephone B Allen
*Assistant Examiner* — Rahman Abdur
(74) *Attorney, Agent, or Firm* — Foley & Lardner LLP

(57) ABSTRACT

A head-up display for a vehicle has a laser and a scanning system. An image, which is to be displayed in the field of vision of the driver of the vehicle and which is composed of individual pixels, is produced pixel-by-pixel by the laser and the scanning system. The head-up display has a projection system having a projection surface and a magnifying optical system. The projection system projects the image to be displayed onto a virtual image plane and magnifies the image in the process. The size of the pixels in the virtual image plane is smaller than the resolving ability of the human eye, which is the case for an angular distance less than 0.5', for example.

10 Claims, 2 Drawing Sheets

(58) Field of Classification Search
USPC .......... 359/630, 631, 632, 633, 634, 13,
478,359/364, 365, 434, 197.1, 212.1,
223.1; 348/E07.085, E09.026, 44, 148;
345/7, 9; 353/10, 11, 12, 13, 14, 28
See application file for complete search history.

(56) References Cited

FOREIGN PATENT DOCUMENTS

| DE | 100 35 040 A1 | 2/2002 | | |
|----|---|---|---|---|
| DE | 10035040 A1 | * | 2/2002 | .......... G02B 26/101 |
| DE | 1020060 40 346 A1 | 3/2008 | | |
| EP | 0 391 231 B1 | 10/1990 | | |

OTHER PUBLICATIONS

Fan Chao and Siyuan He, Development of a Micromirror Based Laser Vector Scanning Automotive HUD, Aug. 7, 2011, Proceedings of the 2011 !EEE, International Conference on Mechatronics and Automation.*

Fan Chao et al: "Development of a micromirror based laser vector scanning automotive HUD" Mechatronics and Automation (ICMA), 2011 International Conference on, IEEE,Aug. 7, 2011 (Aug. 7, 2011), pp. 75-79, XP032019603, DOI:10.1109/ICMA.2011.5985634, ISBN: 978-1-4244-8113-2 Figures 1,3,7,8.

International Search Report and Written Opinion in PCT/EP2013/066725 dated Nov. 4, 2013, 11 pages.

Office Action in German priority application No. 10 2013 001 097.7 dated Nov. 7, 2014, 5 pages.

* cited by examiner

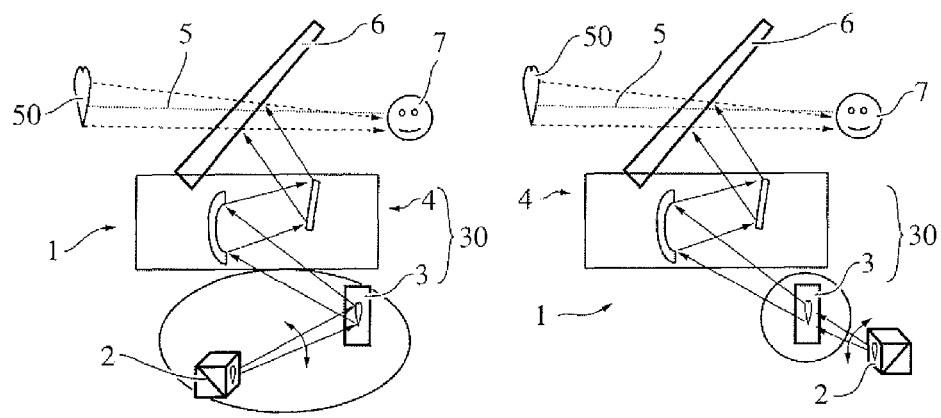
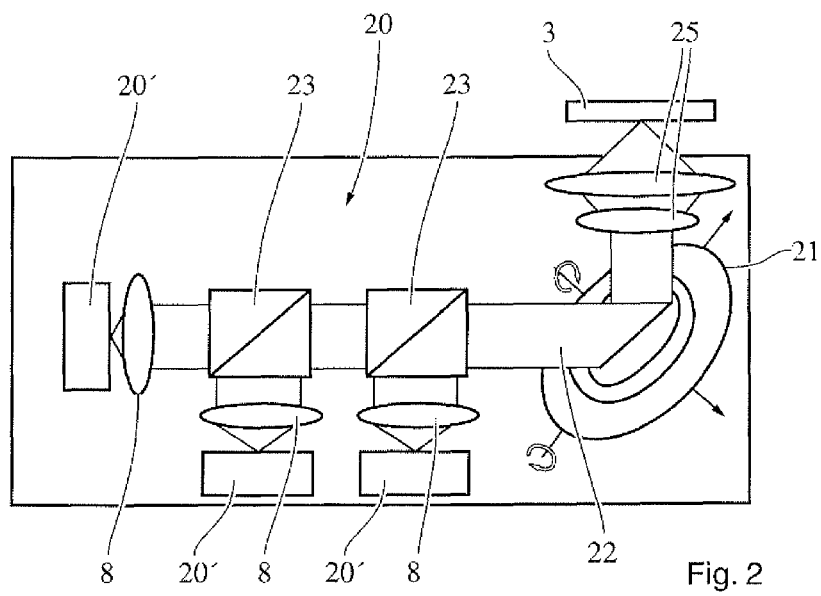

LASER SCANNING HEAD-UP DISPLAY SYSTEM FOR VEHICLES

CROSS REFERENCE TO RELATED APPLICATIONS

The present application is a U.S. National Stage of International Application No. PCT/EP2013/066725 filed on Aug. 9, 2013, which claims the benefit of German Patent Application Nos. 10 2012 015 809.2 filed on Aug. 10, 2012 and 10 2013 001 097.7 filed on Jan. 23, 2013, the entire disclosures of all of which are incorporated herein by reference.

PRIOR ART

The present invention relates to a head-up display in accordance with the preamble of claim 1.

Head-up displays (HUDs) are known from the prior art and are used for displaying information in a virtual plane, for example in front of the windshield of a motor vehicle. A vehicle occupant or a driver of the vehicle can read off the information, without having to lower his gaze to the dashboard. This increases convenience and safety for the driver.

Here, the image to be displayed is generally first of all projected onto a projection area as an intermediate plane and then magnified, before it is reflected at the windshield or at a so-called combiner and then becomes visible in the virtual plane in front of the windshield. In the case of an HUD, a laser is preferably used as radiation source, which laser generates the image to be displayed by means of the so-called "laser scanning method".

However, the use of lasers is disadvantageous in that there are unwanted brightness differences, so-called speckles, in the displayed image due to image noise.

DISCLOSURE OF THE INVENTION

It was therefore the object of the present invention to provide a head-up display which does not have the disadvantages of the prior art and ensures improved display quality. In particular, the head-up display should not have unwanted brightness differences that are perceivable by any user.

This object is achieved by a head-up display including a laser, in particular an RGB laser, and a scanning system, by means of which the image to be displayed is generated point-by-point, which image is projected by a projection system, which includes a projection area and magnification optics, into a virtual image plane and magnified in the process, wherein the projection system is configured in such a way that the size of the spots in the virtual image plane is smaller than the resolving power of the human eye.

It was found that the formation of the unwanted brightness differences is suppressed if the sizes of the spots are selected to be smaller than the resolving power of the human eye. The display quality of the image displayed in the virtual plane is therefore substantially improved over the prior art. Under ideal conditions, the resolving power of the human eye is approximately 0.5' to 1' (corresponding to 1 mm at 3-6 meters). Therefore, the projection system of the head-up display according to the invention is, in particular, selected in such a way that the sizes of the spots in the virtual plane are smaller than 0.5' for the observing vehicle occupant or driver. It is conceivable to preferably replace the term laser spot by the term pixel.

Advantageous embodiments and developments of the invention can be gathered from the dependent claims and from the description, with reference being made to the drawings.

Preferably, the laser is selected in such a way that the laser spots on the projection area are so small that they still are smaller than the resolving power of the human eye after magnification in the virtual image plane of the image to be displayed.

Alternatively or additionally, the number of laser spots, by means of which the image to be displayed is displayed on the projection area, is selected to be so large that the human eye can no longer perceive the individual laser spots individually in the virtual plane. Advantageously, such a high resolution is therefore obtained that no brightness differences are perceived by the observer or vehicle occupant and therefore an increased display quality is obtained compared to the prior art. In average conditions, two spots are perceivable as separate by the human eye if their angular distance is 2'. Therefore, the head-up display is, in particular, configured in such a way that the angular distance between two adjacent spots is always less than 0.5' for the vehicle occupant or driver. This ensures that adjacent points are always interpreted as a contiguous area by the observer.

In accordance with a preferred embodiment of the present invention, provision is made for the scanning system to be configured in such a way that a scanning frequency, by means of which the image to be displayed is generated, is higher than the perception frequency of the human eye. Advantageously, this therefore makes it possible to use a larger number of laser spots and, as a result of this, a higher resolution for increasing the display quality.

A further object of the present invention is a method for operating a head-up display in a vehicle, wherein a laser and a scanning system are used to project a projection image consisting of a plurality of laser spots onto a projection area point-by-point, wherein a projection system is used to generate a magnified virtual image of the projection image in a field of view of a driver of the vehicle, characterized in that the laser spots are projected into the field of view of the driver in such a way that the size of the laser spots projected into the virtual image plane is smaller than the resolving power of the human eye.

In accordance with a preferred embodiment of the present invention, provision is made for laser spots to be generated on the projection area by means of the laser which are so small that the laser spots are still smaller than the resolving power of the human eye after magnification in the virtual image plane of the image to be displayed.

In accordance with a preferred embodiment or a further object of the present invention, provision is made for the number of laser spots, by means of which the image to be displayed is displayed on the projection area, to be selected to be so large that the human eye can no longer perceive the individual laser spots individually in the virtual plane.

In accordance with a preferred embodiment of the present invention, provision is made for the virtual image to be projected into the virtual image plane by means of relay optics.

In accordance with a preferred embodiment of the present invention, provision is made for the image to be displayed to be generated with a scanning frequency which is higher than the maximum image frequency perceivable by humans, more particularly higher than 20 Hz.

Further details, features and advantages of the invention emerge from the drawings and from the following description of preferred embodiments on the basis of the drawings.

BRIEF DESCRIPTION OF THE DRAWINGS

FIG. 1 shows the head-up display according to the invention.

FIG. 2 shows the generation of the image on the projection plane.

EMBODIMENTS OF THE INVENTION

Figure 3:
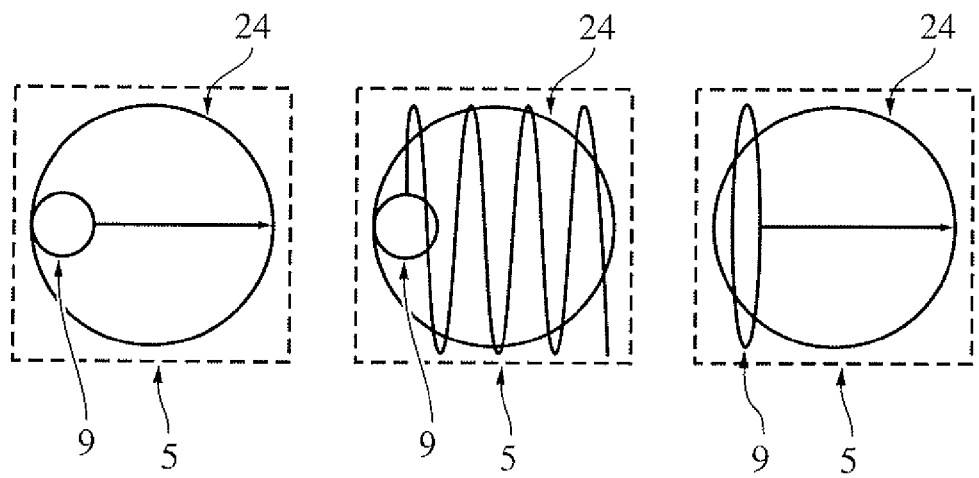
FIG. 3 shows possible ways of scanning a laser spot for generating the image to be displayed.

In the various figures, equivalent parts are always provided with the same reference signs and are also therefore, in general, respectively only named or mentioned once.

FIG. 1 depicts two possible head-up displays 1 according to the invention. The two head-up displays 1 are substantially identical, with the left-hand head-up display 1 being of the so-called reflection type and the right-hand head-up display 1 being of the so-called transmission type. With reference to the left-hand representation, a picture to be displayed is built up point-by-point from individual laser spots by means of a laser 20 and a corresponding mechanism 2, projected onto a projection plane 3 and reflected there. This image reflected by the projection plane 3 is magnified by means of magnification optics 4 of a projection system 30 and reflected at the windshield 6 into a virtual image plane 5 in which the image, in this case a heart 50, is visible to the human eye 7 of the vehicle driver. The head-up display 1 on the right-hand side substantially corresponds to the representation of the head-up display 1 on the left-hand side, with, in the present case, the image to be displayed not being reflected at the projection plane 3, but rather being transmitted through the projection plane 3. In both systems, the projection system 30 is now, according to the invention, configured in such a way that the laser spots, by means of which the image is produced on the projection plane 3, are so small that they are smaller than the maximum resolving power of the human eye 7, even after magnification and display in the virtual plane 5 by means of the projection system 30; in particular, the sizes of the spots in the virtual plane 5 are less than 0.5' for the observing vehicle driver. Alternatively or additionally, the number of laser spots, by means of which the image to be displayed is displayed on the projection area 3, is selected to be so large that the human eye 7 can no longer perceive the individual laser spots individually in the virtual plane 5. Therefore, the resolution of the image to be displayed exceeds the maximum possible resolution of the human eye 7.

FIG. 2 depicts a red-green-blue laser 20. The laser light 22 of different wavelengths, emitted by the individual laser sources 20' (red, green, blue), is initially sent through a collimator 8 in each case, which aligns the rays of the respective laser source 20 parallel to one another. Then, the rays of different wavelengths are combined with one another by means of two mirrors 23 and moved by means of a scanning system 21, in particular by means of a mechanism and/or optics, in such a way that the desired image is produced on the projection area 3. Here, the image is built up from individual ray packets, which are generated by the focused laser beam 22 passing over the projection area 3 in a line-by-line manner and by corresponding switching on/off of the laser sources 20' of different colors and which form individual laser spots on the projection area 3. The extent of the laser spots in the area of the projection area 3 is dimensioned in such a way that the extent of the laser spots, even after the magnification of the laser spots by the projection system 30 in the virtual plane 5, is less than the maximum resolving power of the human eye 7. The laser beam 22 is projected onto the projection area 3 by way of a lens system.

FIG. 3 shows, in an exemplary manner, a possible movement pattern of the laser spot for generating the desired image 50. The scanning frequency of this laser spot is preferably higher than the temporal resolving power of the human eye 7; that is to say, so many images are generated per second that the individual images are no longer perceivable by the human eye. In other words: the scanning system 21 of the head-up display 1 is configured in such a way that the scanning frequency, by means of which the image 50 to be displayed is generated, is higher than the perception frequency of the human eye 7. The limits of the human eye 7 are plotted schematically as maximum resolving power 24.

Figure 4:
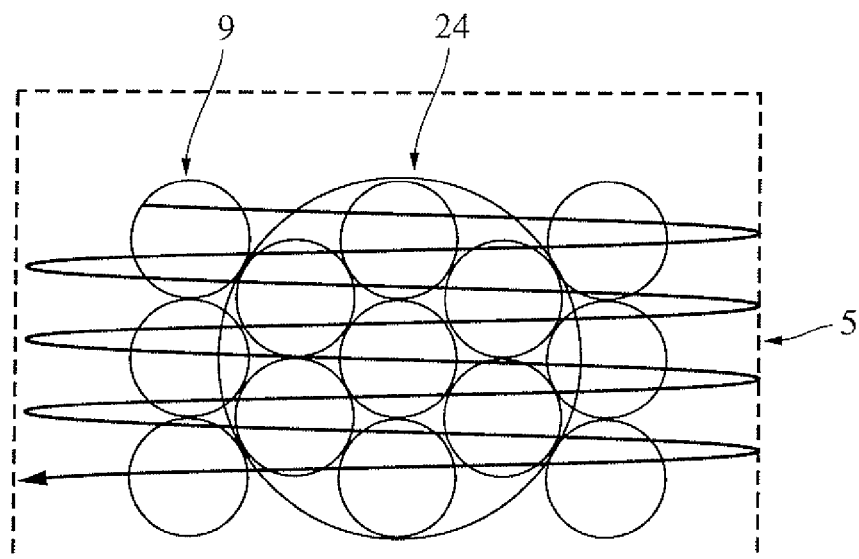
FIG. 4 shows discrete laser spots for generating the image to be displayed.

Different laser spots for generating the desired image during the scanning process are depicted schematically in FIG. 4. According to the invention, the laser spots 9 are so small and/or the number thereof is so high that the human eye 7 can no longer resolve the individual laser spots. The limits of the human eye 7 are plotted schematically as maximum resolving power 24. As a result of the limited resolution of the human eye 7, the plurality of small laser spots 9 is identified as a contiguous image area by the observer.

LIST OF REFERENCE SIGNS

1 Head-up display (HUD)
2 Laser and scanning mechanism
3 Projection area
4 Magnification optics, relay optics
5 Virtual plane
6 Windshield
7 Human eye
8 Collimator
9 Laser spots
20 Laser
20' Laser source
21 Scanning system
22 Laser light
23 Mirror
24 Resolving power
25 Lenses
30 Projection system
50 Displayed image in the virtual plane

The invention claimed is:

1. A head-up display for a vehicle, comprising:
   a laser and a scanning system, by which an image to be displayed in a field of view of a vehicle occupant is generated point-by-point from individual laser spots; and
   a projection system with a projection area and magnification optics, wherein the projection system is configured to project the image to be displayed into a virtual image plane and to magnify it in the process, wherein the projection system is configured in such a way that the size of the laser spots in the virtual image plane is smaller than the resolving power of the human eye, wherein the size of the spots in the virtual plane is smaller than 0.5' for the observing vehicle occupant, wherein the angular distance between two adjacent spots is always less than 0.5' for the vehicle occupant.

2. The head-up display as claimed in claim 1, wherein the laser is configured such that the laser spots on the projection area are so small that they still are smaller than the resolving power of the human eye after magnification in the virtual image plane of the image to be displayed.

3. The head-up display as claimed in claim 1, wherein the head-up display is configured such that the number of laser spots, by which the image to be displayed is displayed on the projection area, is greater than a number of laser spots at which the angular distance between two adjacent spots is always less than 0.5' for the vehicle occupant.

4. The head-up display as claimed in claim 1, wherein the projection system includes relay optics.

5. The head-up display as claimed in claim 1, wherein the scanning system is configured such that a scanning frequency, by which the image to be displayed is generated, is higher than the perception frequency of the human eye.

6. A method for operating a head-up display in a vehicle, as claimed in claim 1, wherein a laser and a scanning system are used to project a projection image having a plurality of laser spots onto a projection area point-by-point, wherein a projection system is used to generate a magnified virtual image of the projection image in a field of view of a vehicle occupant, wherein the laser spots are projected into the field of view of the driver in such a way that the size of the laser spots projected into the virtual image plane is smaller than the resolving power of the human eye.

7. The method as claimed in claim 6, wherein laser spots are generated on the projection area by the laser which are so small that the laser spots are still smaller than the resolving power of the human eye after magnification in the virtual image plane of the image to be displayed.

8. The method as claimed in claim 6, wherein the number of laser spots, by which the image to be displayed is displayed on the projection area, is greater than a number of laser spots at which the size of the spots in the virtual plane is smaller than 0.5' for the observing vehicle occupant and the angular distance between two adjacent spots is always less than 0.5' for the vehicle occupant.

9. The method as claimed in claim 6, wherein the virtual image is projected into the virtual image plane by relay optics.

10. The method as claimed in claim 6, wherein the image to be displayed is generated with a scanning frequency which is higher than the perception frequency of the human eye.

\* \* \* \* \*